United States Patent
Maass

(10) Patent No.: US 7,289,059 B2
(45) Date of Patent: Oct. 30, 2007

(54) METHOD AND DEVICE FOR COURSE PREDICTION IN MOTOR VEHICLES

(75) Inventor: Alexander Maass, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 185 days.

(21) Appl. No.: 11/166,520

(22) Filed: Jun. 23, 2005

(65) Prior Publication Data

US 2006/0001566 A1    Jan. 5, 2006

(30) Foreign Application Priority Data

Jun. 25, 2004  (DE) ............... 10 2004 030 752

(51) Int. Cl.
 *G01S 13/93* (2006.01)
(52) U.S. Cl. .................. 342/70; 342/71; 342/146; 340/903; 340/435; 340/436; 701/301
(58) Field of Classification Search ............ 342/70–72, 342/146; 701/41, 200, 301; 340/435, 436, 340/903
See application file for complete search history.

(56) References Cited

U.S. PATENT DOCUMENTS

| | | | | |
|---|---|---|---|---|
| 6,121,916 A * | 9/2000 | McDade | ................. | 342/70 |
| 6,469,656 B1 * | 10/2002 | Wagner et al. | ............. | 342/70 |
| 6,832,156 B2 * | 12/2004 | Farmer | ................. | 701/301 |
| 7,218,207 B2 * | 5/2007 | Iwano | ................. | 340/435 |
| 7,221,913 B2 * | 5/2007 | Golden et al. | ............ | 455/67.16 |
| 7,224,290 B2 * | 5/2007 | Takenaga et al. | .......... | 340/907 |
| 2005/0134440 A1 * | 6/2005 | Breed | ................. | 340/435 |
| 2005/0182539 A1 * | 8/2005 | Maass | ................. | 701/41 |
| 2005/0228580 A1 * | 10/2005 | Winner et al. | ............ | 701/200 |
| 2006/0001566 A1 * | 1/2006 | Maass | ................. | 342/70 |
| 2006/0152346 A1 * | 7/2006 | Maass et al. | ............ | 340/425.5 |

FOREIGN PATENT DOCUMENTS

| | | |
|---|---|---|
| DE | 199 44 542 | 4/2001 |
| DE | 199 53 790 | 5/2001 |

(Continued)

OTHER PUBLICATIONS

"Safer car driving by robust steering control", Ackermann, J. Control '96, UKACC International Conference on (Conf. Publ. No. 427) vol. 2, Sep. 2-5, 1996 p. 733.*

(Continued)

*Primary Examiner*—John B Sotomayor
(74) *Attorney, Agent, or Firm*—Kenyon & Kenyon LLP

(57) ABSTRACT

A method and a device for course prediction in motor vehicles, which have a position-finding system for objects situated in front of the vehicle, where a function describing the path of the roadway is calculated on the basis of measured distance and angular data, in that several fixed targets are identified and tracked and supplied (subjected) to a statistical evaluation, a plausibility criterion being that at least one parameter of the functions, which describe these roadway paths, has a significant frequency maximum at the value which corresponds to the real roadway path. At the beginning of the evaluation, the frequency distribution for all parameters is set to a predefined frequency value, and the frequency values of the parameters are reduced or increased by a predefined numerical value as a function of the position of fixed targets or vehicles.

8 Claims, 2 Drawing Sheets

FOREIGN PATENT DOCUMENTS

DE    102 18 924    11/2003

OTHER PUBLICATIONS

"Signal processing and waveform generation in the side zone automotive radar", Reed, J.C. Digital Avionics Systems Conference, 1998. Proceedings., 17th DASC. The AIAA/IEEE/SAE vol. 2, Oct. 31-Nov. 7, 1998 pp. 123/1-12310.*

"A multistatic microwave radar sensor for short range anticollision warning", Giubbolini, L. Vehicular Technology, IEEE Transactions on vol. 49, Issue 6, Nov. 2000 pp. 2270-2275.*

* cited by examiner

METHOD AND DEVICE FOR COURSE PREDICTION IN MOTOR VEHICLES

FIELD OF THE INVENTION

The present invention relates to a method and a device for course prediction in motor vehicles, which have a position-finding system for objects located in front of the vehicle, where a function describing the path of the roadway is calculated on the basis of measured distance and angular data, in that several fixed targets are identified and tracked and subjected to a statistical evaluation, a plausibility criterion being that at least one parameter of the function, which describes these roadway paths, has a significant frequency maximum at the value which corresponds to the real roadway path. At the beginning of the evaluation, the frequency distribution for all parameters is set to a predefined frequency value, and the frequency values of the parameters are reduced or increased by a predefined numerical value as a function of the position of fixed targets or vehicles.

BACKGROUND INFORMATION

German Patent Application No. DE 102 18 924 describes a method and a device for course prediction in motor vehicles, which have a position-finding system for objects located in front of the vehicle, where a function describing the path of the edge of the roadway is calculated on the basis of measured distance and angular data for fixed targets at the edge of the road, several fixed targets being identified and tracked, so that one estimates the path of the roadway edge for different subsets of the set of tracked fixed targets, under the assumption that these fixed targets are situated at the edge of the roadway, and that one distinguishes between roadway-edge targets and interfering objects in view of the plausibility of the possible roadway-edge curves obtained and determines the most likely roadway-edge path on the basis of the roadway-edge targets.

SUMMARY OF THE INVENTION

An essence of the present invention is to provide a method and a device, which allow the real radius of curvature of the roadway to be ascertained with a high degree of certainty.

It is advantageous that preceding vehicles are detected on the basis of measured distance and angular data, and that the frequency values of the parameters, whose functions describe a roadway path on which a preceding vehicle was detected, are increased by a predefined value.

In addition, it is advantageous that the location data of preceding vehicles are used as a plausibility criterion for assigning fixed targets to the left or right side of the roadway and/or for identifying interfering objects.

It is also advantageous that the possible roadway-edge paths and the most likely roadway-edge path are described by a polynomial of the form $y = a + cx^2 + \ldots$ In each instance, the coordinates of at least one fixed target are used as reference points for calculating the polynomial, and an assumed or known value of the distance of the roadway edge at the level of the vehicle is used for a constant term of the polynomial.

Furthermore, it is advantageous that the statistical evaluation of the possible roadway-edge paths is carried out in view of the specific measuring accuracy.

It is particularly advantageous that fixed targets, which have already left the detection range of the position-finding system, and whose positions are calculated on the basis of the known vehicle movement, are also used for determining the path of the roadway edge.

If a stationary object is detected, then one may take this information as an indication that the path of the road probably does not run exactly to this stationary object. This means that each curve which runs from the vehicle to a stationary object is theoretically ruled out as the path of the road. However, since each stationary object may have resulted from a faulty measurement, the complete elimination of the specific roadway curve is too severe a criterion for determining the most likely course of the roadway. This evaluation is improved in that, in the frequency distribution already present, one starts, in each instance at the beginning, with a specific column height and, for each parabolic curve that describes a roadway-edge path running towards a stationary object, one reduces the probability value describing the probability of the corresponding road curvature, by a specific numerical value. By this means, this curvature becomes less probable than the remaining ones.

In addition, one may improve the method by assuming that preceding vehicles are traveling on the same road. For each parabolic curve that describes a roadway path running from the reference vehicle to a preceding vehicle, the frequency value of a parabolic curvature c is increased by a predefined value in the frequency distribution, i.e. this roadway-edge curvature is rendered more probable than others. Since the lane in which the preceding vehicle is traveling is not known, the position of the preceding vehicle, along with a tolerance range to the left and right, should be considered as a plausible road path, and the curvature tolerance range resulting from this should be increased in the frequency distribution.

Particularly important is the implementation of the method of the present invention in the form of a control element provided for a control unit of an adaptive cruise control of a motor vehicle. In this context, a program, which is executable on a computer, in particular on a microprocessor or signal processor, and is suitable for carrying out the method of the invention, is stored on the control element. Therefore, in this case, the present invention is realized by a program stored on the control element, so that this control element provided with the program represents the present invention in the same manner as the method, for whose implementation the program is suited. In particular, an electric storage medium, e.g. a read-only memory, may be used as a control element.

DETAILED DESCRIPTION

Figure 1:
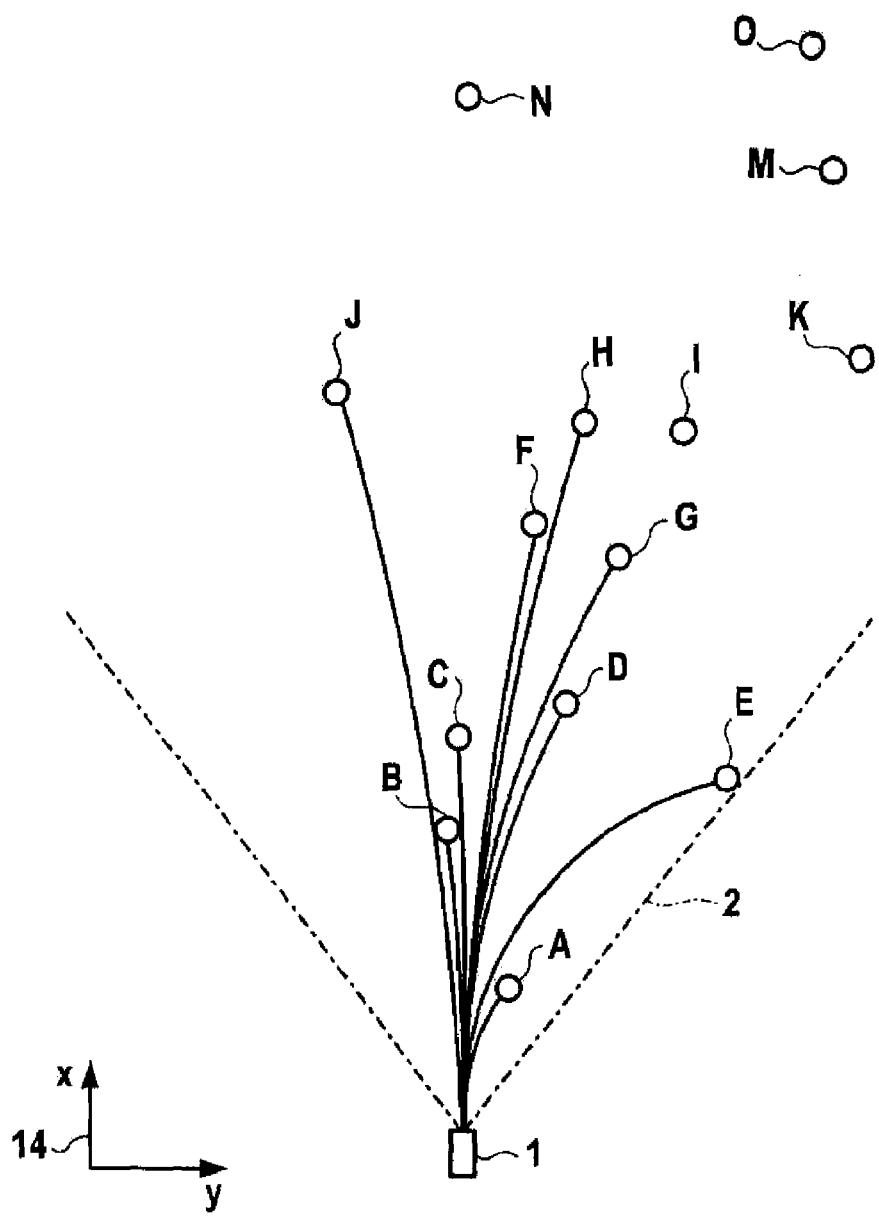
FIG. 1 shows a diagram that indicates, in a two dimensional coordinate system, the position of a vehicle and the positions of objects located by a position-finding system of the vehicle, parabolic curves for possible roadway paths being drawn in for each object.

Shown in FIG. 1 is a motor vehicle 1 having a position-finding system, by which objects in the region in front of vehicle 1 may be detected. This position-finding system is, for example, a system that ascertains at least the distance and the azimuth angle with respect to reference vehicle 1, using radar radiation, laser radiation, ultrasonic waves, or a video sensor, and implements longitudinal control of vehicle 1 and, optionally, lateral control of vehicle 1 from these object data. Objects A through O, whose positions with respect to vehicle 1 may be described with the aid of a two-dimensional coordinate system 14, were detected by the position-finding system. By comparing the positions of objects A through O and their positional changes as a function of time, or as a result of a measurable Doppler effect of the measuring radiation, it is possible to determine the relative velocity of detected objects A through O, and in conjunction with the knowledge of the velocity of motor vehicle 1, it may be determined if the detected objects are stationary or moving objects. The goal of the method for detecting the edge of the roadway is to identify the path of the traffic lane by determining which of the detected objects is an object at the edge of the traffic lane and which is an object further away from the traffic lane. With regard to objects A through H, parabolas of theoretically possible, but improbable roadway paths were determined, which are drawn into FIG. 1. In order to determine which parabolic curve most likely corresponds to the actual course of the road, curvatures c of the parabolic lines are calculated and subjected to a statistical evaluation.

Figure 2:
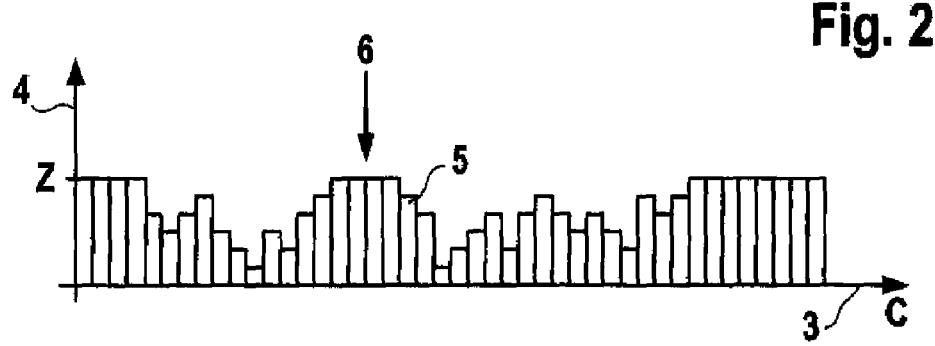
FIG. 2 shows a probability graph, in which the probability of the possible roadway path is plotted versus radius of curvature c of a calculated roadway curve.

To illustrate the statistical evaluation, FIG. 2 shows a graph, in which probability 4 that a calculated parabolic curvature value c describes the actual roadway path is plotted as a function of parabolic curvature c on abscissa 3. At the beginning of the evaluation, the probability of all parabolic curvatures c is set to a predefined value Z. In the course of the detection and evaluation of the roadway paths, the probability of each curvature value c, in whose parabolic roadway curve a stationary object was detected, is lowered by a predefined value $\Delta Z$, since it is improbable that the actual roadway path is in the precalculated road curve in which a stationary object is positioned. As an alternative, it would be possible to set the probability of this parabolic curvature value c to 0, but the detected stationary object may also be an interfering object resulting from a faulty measurement, i.e. an instance of detection may have taken place, although no object is present at this location. Therefore, for objects recognized several times as being stationary, it is better to lower the probability value for each instance of detection, so that interfering reflections capable of falsifying the result only have very little influence on the result. Furthermore, it is possible to monitor preceding, detected objects within the detection limits of the position-finding system and to also calculate a parabola for these preceding objects, which describes a possible roadway path. Since a preceding vehicle is a vehicle, which is traveling on the same road as reference vehicle 1, the probability of parabolic value c, in whose roadway-path parabola the preceding vehicle was detected, is increased by a predefined value $\Delta Z'$. To this end, probability value 5 of radius of curvature c is increased, so that the incrementing of probability values 5 as a result of preceding, detected vehicles and the decrementing of probability values 5 as a result of detected stationary objects bordering the edge of the road allow a probability profile having peaks and valleys to be formed as a function of radius of curvature c. Probability values 6 exhibiting highest probability 4 represent parabolas, which have a curvature c whose paths most likely correspond to the real roadway path lying ahead.

Figure 3:
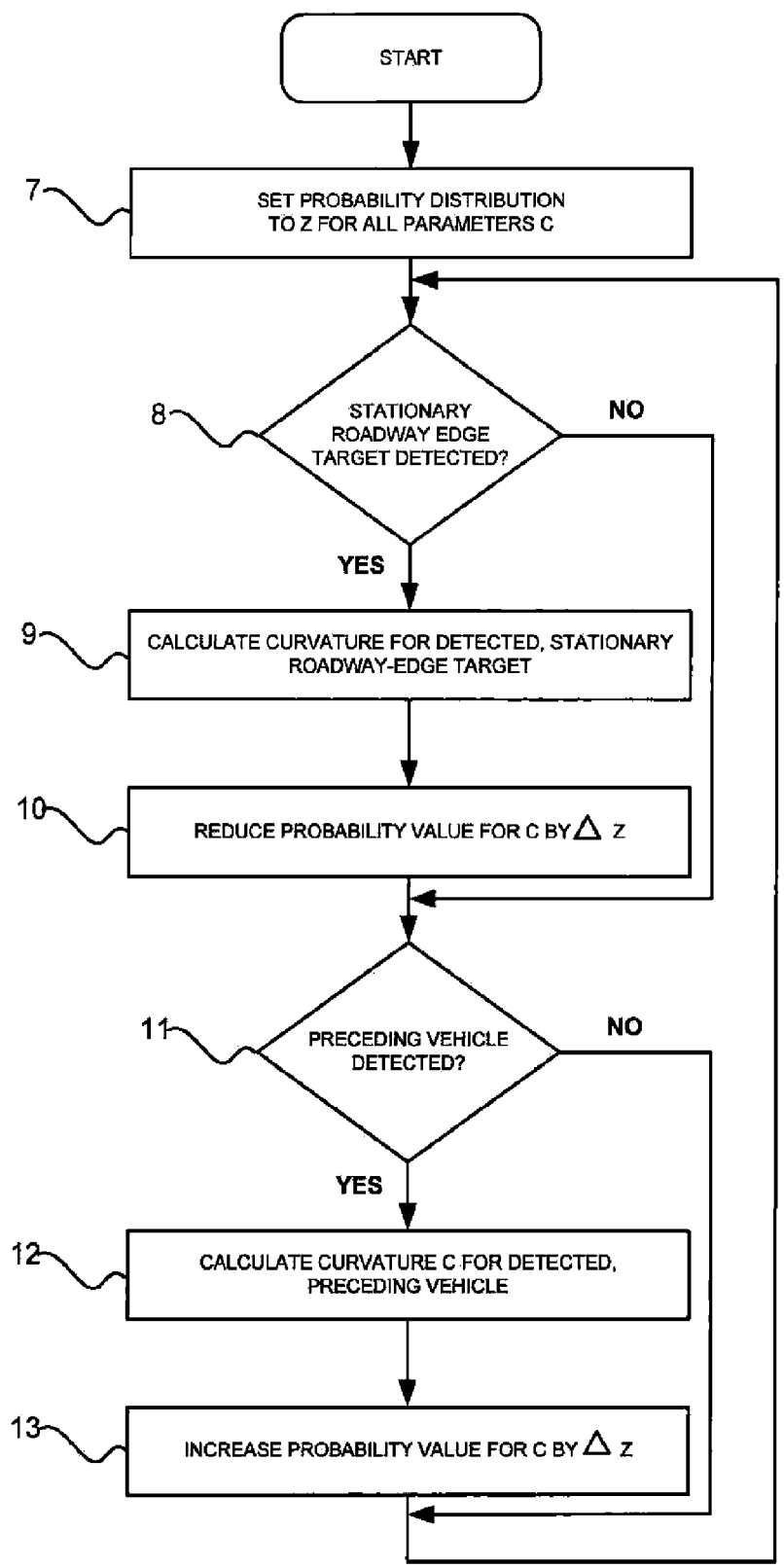
FIG. 3 shows a flow chart of a specific embodiment of the method according to the present invention.

Shown in FIG. 3 is a flow chart, which represents a possible procedure for determining the most likely roadway path. After the flow chart has started at the beginning, the probability distribution for all parameters c, which represent, for example, the curvature of the roadway, are set to a predefined value Z in step 7. In step 8, it is subsequently determined if a stationary roadway-edge target was detected by the position-finding system. If a stationary roadway-edge target was not detected, then, in step 8, the chart branches to no and is continued between steps 10 and 11. For the case in which steps 11 through 13 are eliminated in this diagram, then, in this case, the chart would be continued in step 8, which means that a wait loop is formed until a roadway-edge target is detected. If, in step 8, it is determined that a roadway-edge target is present, then, in step 9, curvature c of a parabola is determined, which represents a roadway path in whose course the detected, stationary roadway-edge target is positioned. In step 10, probability value 4 for curvature value c calculated in step 9 is subsequently decreased by a predefined value $\Delta Z$, since it is improbable that a stationary object is positioned in the path of the roadway.

After step 10, the method may alternatively branch to step 8, and it may be checked if a stationary roadway-edge target was detected, when the probability distribution should only be ascertained as a function of the objects recognized as being stationary. Furthermore, it is possible to continue the method after step 11, in which it is checked if a preceding vehicle was detected. If no preceding vehicle was detected, then the method skips to step 8, in which it is checked if a stationary roadway-edge target was detected. If a preceding vehicle was detected, then a curvature c of a parabola, in whose path the preceding vehicle is positioned, is calculated in step 12. According to subsequent step 13, curvature c ascertained in step 12 is taken into account in the graph of FIG. 2, in that probability value 4 of parabolic curvature c, along with a tolerance range, is increased by predefined value $\Delta Z'$, since it is probable that the preceding vehicle is traveling on the same road as reference vehicle 1.

The flow chart then branches again to step 1, and it is checked if a stationary roadway-edge target is detected. This method may be continued, for example, until a probability profile as a function of curvature value c is produced, in which the peak value of maximum 6 has exceeded a minimum probability value. As an alternative, it is also conceivable for this method to be implemented for a predefined period of time and to be subsequently restarted with a new probability distribution according to step 7. Furthermore, it is also conceivable for the method to be implemented continuously, in which case the generated probability profile above the abscissa must be shifted, because when reference vehicle 1 moves, stationary objects that are at the edge of the roadway and are detected by the object-detection system change their azimuthal detection angle as a function of the velocity of the vehicle and of the course of the vehicle, which means that the probability profile must likewise be shifted in this manner, in order to be able to take into account the azimuthal angular change of the stationary objects with respect to calculated parabolic curvature c.

What is claimed is:

1. A method for course prediction in a motor vehicle which has a position-finding system for objects situated in front of the vehicle, the method comprising:
   on the basis of measured distance and angular data for fixed targets at an edge of a roadway, calculating a function describing a path of a traffic lane;
   identifying and following a plurality of fixed targets;
   estimating a path of the roadway with the aid of fixed targets, under the assumption that the fixed targets are situated at the edge of the roadway; and
   determining a most likely roadway path on the basis of a statistical evaluation of the roadway-edge targets, one plausibility criterion being that at least one parameter of functions describing roadway paths has a significant frequency maximum at a value which corresponds to a real roadway path, wherein, at a beginning of an evaluation, a frequency distribution has a predefined frequency value for all parameters; and reducing frequency values of the parameters, whose functions describe a roadway path on which a fixed target was detected, by a predefined numerical value.

2. The method according to claim 1, further comprising:
detecting preceding vehicles with the aid of measured distance and angular data; and
increasing frequency values of parameters, whose functions describe a roadway path which runs from a reference vehicle to a preceding vehicle, by a predefined value.

3. The method according to claim 1, wherein location data of preceding vehicles are used as a plausibility criterion for at least one of (a) assigning fixed targets to the left or right sides of the roadway and (b) identifying interfering objects.

4. The method according to claim 1, wherein possible roadway paths and the most likely roadway path are described by polynomials.

5. The method according to claim 4, wherein, in each instance, coordinates of at least one fixed target are used as a point of reference for calculating a polynomial, and one of an assumed and a known value of a distance of the roadway edge at a level of the vehicle is used for the constant term a of the polynomial.

6. The method according to claim 1, further comprising conducting a statistical evaluation of possible roadway paths in view of a specific measuring accuracy.

7. The method according to claim 1, wherein fixed targets, which have already left a detection range of the position-finding system, and whose positions are calculated on the basis of a known vehicle movement, are also used for determining the roadway path.

8. A device for course prediction in a motor vehicle, comprising:

a position-finding system for objects situated in front of the vehicle; and a data-processing system for performing the following:

on the basis of measured distance and angular data for fixed targets at an edge of a roadway, calculating a function describing a path of a traffic lane, identifying and following a plurality of fixed targets, estimating a path of the roadway with the aid of fixed targets, under the assumption that the fixed targets are situated at the edge of the roadway, and determining a most likely roadway path on the basis of a statistical evaluation of the roadway-edge targets, one plausibility criterion being that at least one parameter of functions describing roadway paths has a significant frequency maximum at a value which corresponds to a real roadway path, wherein, at a beginning of an evaluation, a frequency distribution has a predefined frequency value for all parameters; and reducing frequency values of the parameters, whose functions describe a roadway path on which a fixed target was detected, by a predefined numerical value.

* * * * *